(No Model.)  J. F. SEIBERLING.  5 Sheets—Sheet 1.
CORN HARVESTER.

No. 468,832.  Patented Feb. 16, 1892.

Attest:
Geo. T. Smallwood.
G. M. Copenhaver

Inventor:
John F. Seiberling.
By A. M. Smith & Son.
Attorneys.

(No Model.) 5 Sheets—Sheet 2.

J. F. SEIBERLING.
CORN HARVESTER.

No. 468,832. Patented Feb. 16, 1892.

Attest:
Geo. T. Smallwood.
G. M. Copenhaver.

Inventor:
John F. Seiberling
By A. M. Smith & Son
Attorneys.

(No Model.) 5 Sheets—Sheet 3.

J. F. SEIBERLING.
CORN HARVESTER.

No. 468,832. Patented Feb. 16, 1892.

Attest:
Geo. T. Smallwood.
Y. M. Copenhaver

Inventor:
John F. Seiberling.
By A. M. Smith & Son.
Attorneys.

(No Model.) 5 Sheets—Sheet 4.

J. F. SEIBERLING.
CORN HARVESTER.

No. 468,832. Patented Feb. 16, 1892.

Attest:
Geo. T. Smallwood,
J. M. Copenhaver.

Inventor
John F. Seiberling,
By A. M. Smith & Son.
Attorneys.

(No Model.)

J. F. SEIBERLING.
CORN HARVESTER.

No. 468,832.

5 Sheets—Sheet 5.

Patented Feb. 16, 1892.

Attest:
Geo. F. Smallwood.
Alex Scott.

Inventor:
J. F. Seiberling
By Munther Son
Attorneys.

UNITED STATES PATENT OFFICE.

JOHN F. SEIBERLING, OF AKRON, OHIO.

CORN-HARVESTER.

SPECIFICATION forming part of Letters Patent No. 468,832, dated February 16, 1892.

Application filed April 21, 1891. Serial No. 389,836. (No model.)

*To all whom it may concern:*

Be it known that I, JOHN F. SEIBERLING, a citizen of the United States, and a resident of Akron, in the county of Summit and State of Ohio, have invented a new and useful Improvement in Corn-Harvesters, of which the following is a full, clear, and exact description, reference being had to the accompanying drawings, making part of this specification.

My improvement relates to that class of machines arranged to cut two rows of corn simultaneously, and has for its object the delivery of the corn in a standing or upright position by chain conveyers to a binder receptacle and dropper, where it is bound by an automatic binder mechanism and then deposited in standing position on the ground. The means employed for this purpose will be understood from the following description, reference being had to the accompanying drawings, in which—

Figure 1:
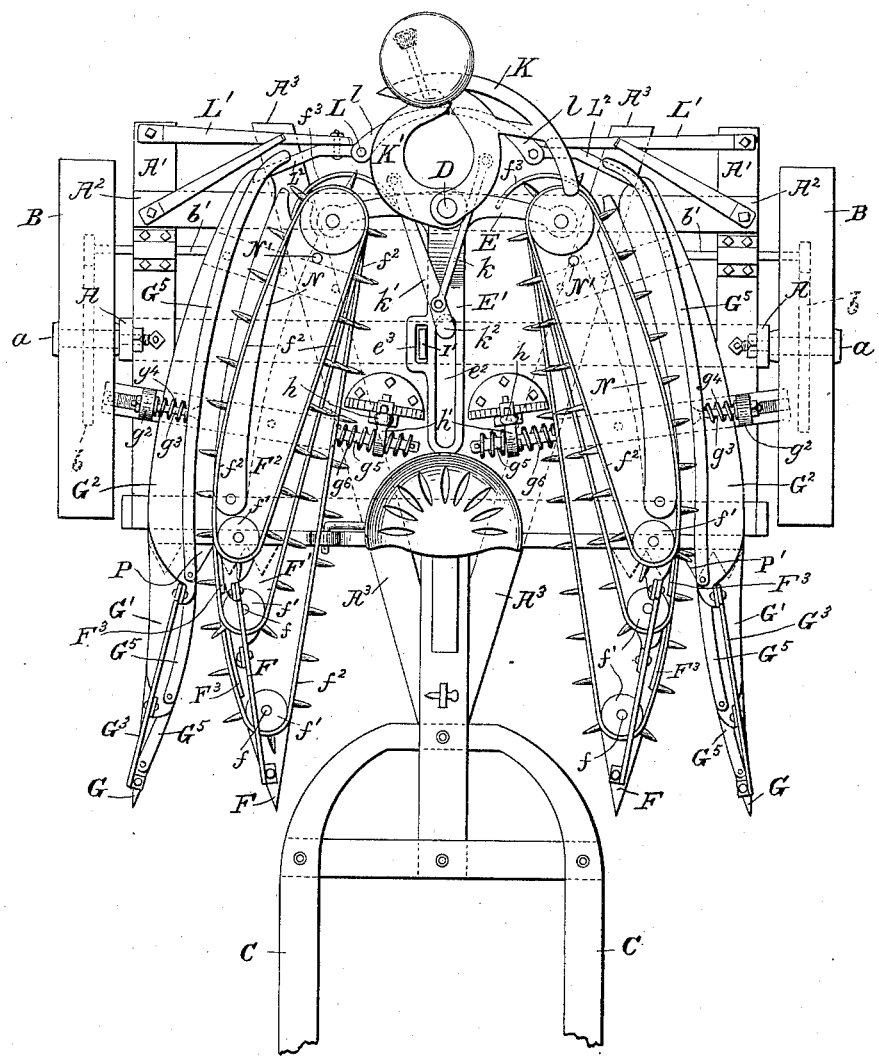
Figure 2:
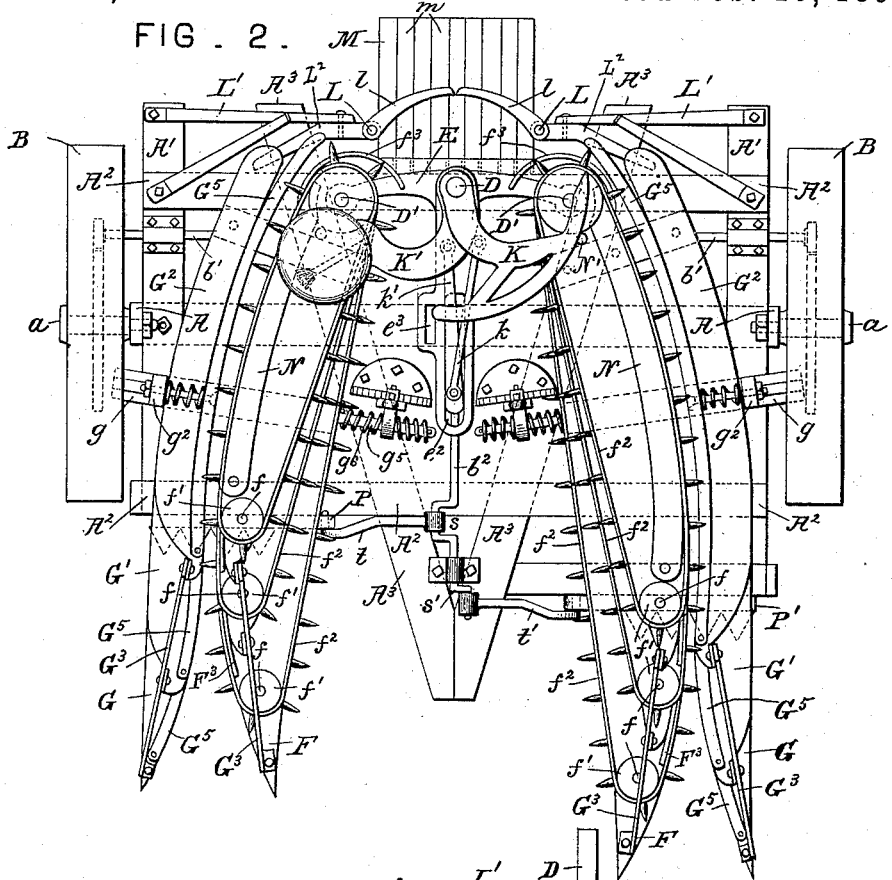
Figure 3:
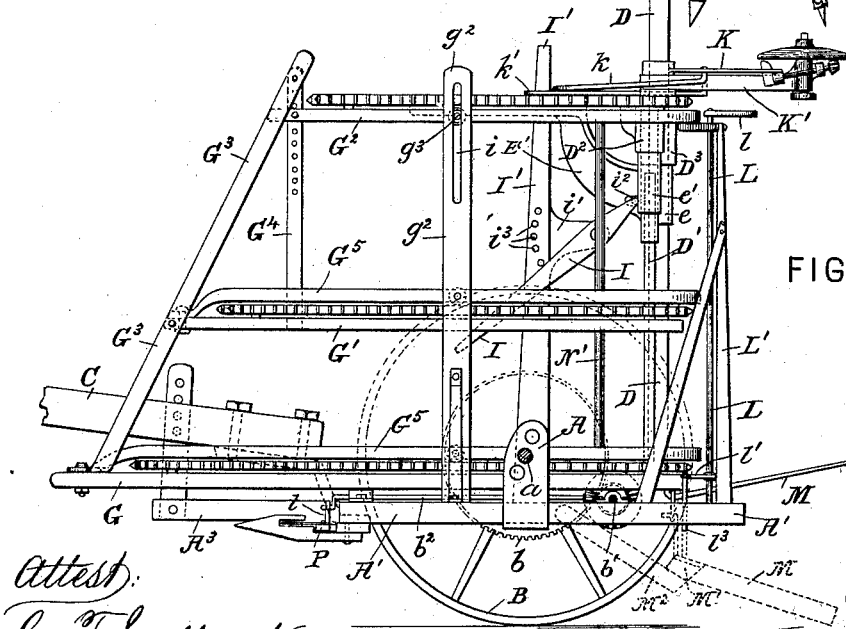
Figure 4:
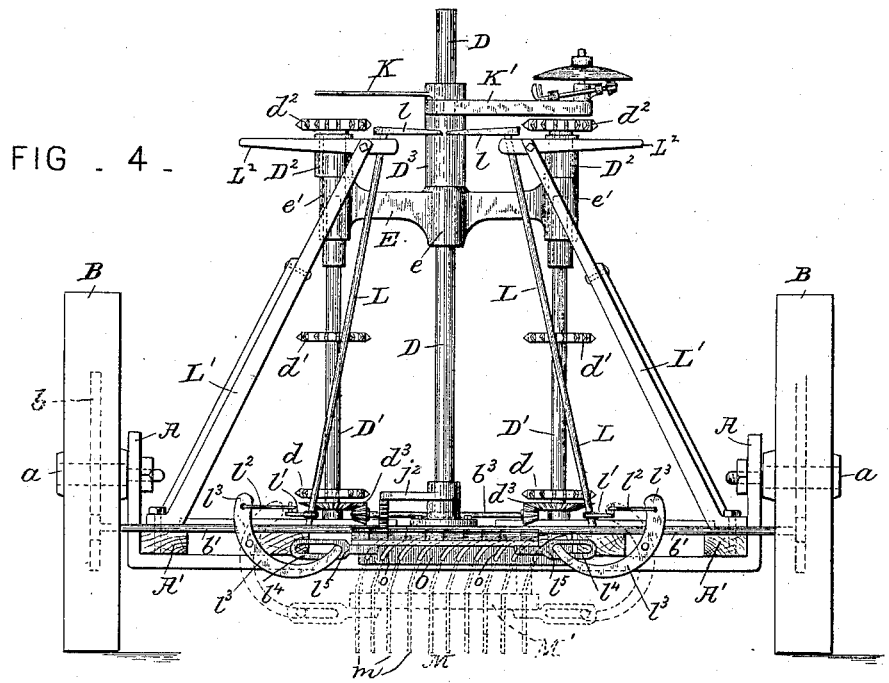
Figure 5:
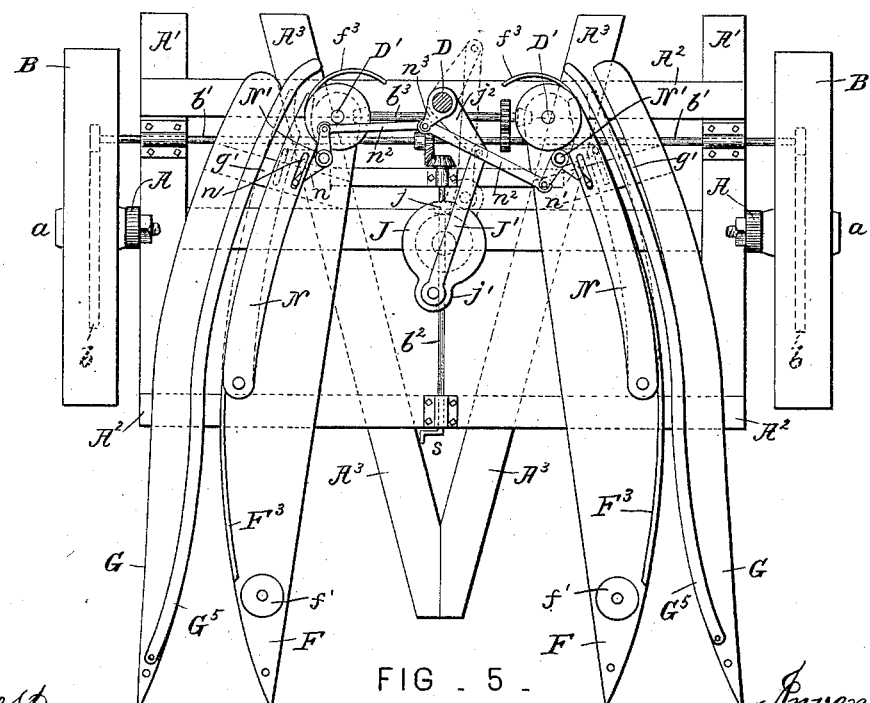
Figure 6:
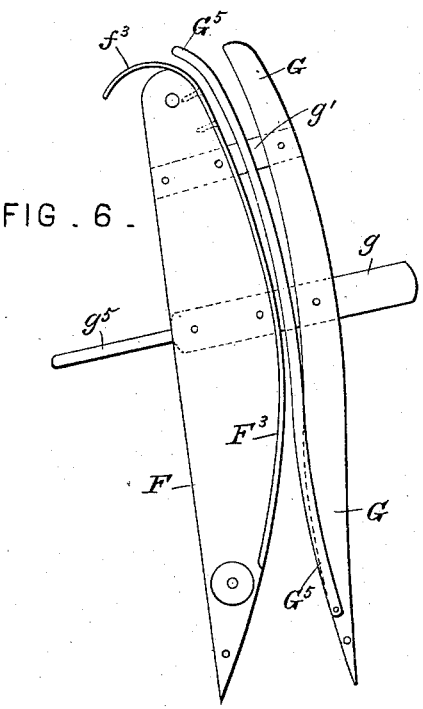
Figures 7, 8:
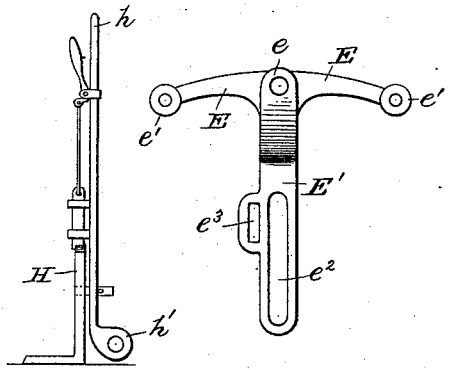
Figure 13:
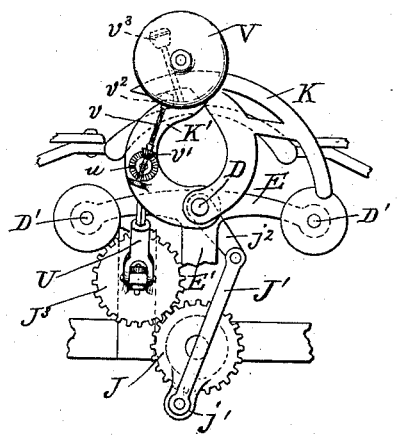

Figure 1 is a plan view of a corn-harvester with my improvements in part applied. Fig. 2 is a similar view showing the preferred arrangement of the cutters with the draft attachment removed and the binder-receptacle and dropper applied. Fig. 3 is a side elevation, and Fig. 4 is a rear elevation, of the machine. Fig. 5 is a plan view with the chain conveyers and other parts removed to more clearly show the devices beneath them. Fig. 6 is a plan view of one of the adjustable corn-guides, and Figs. 7, 8, 9, 10, 11, and 12 detail views of parts hereinafter described. Fig. 13 is a plan view, and Fig. 14 a side elevation, of so much of the binder mechanism as is necessary to show the knotter-actuating devices.

A indicates an axle-bar made in the form of a double crank or having uprights at its ends to which the short axles $a$ $a$ are adjustably secured in any suitable manner, thereby depressing the main body of the bar, which forms also the main transverse sill of the machine-frame, to the desired proximity with the ground. To the bar A longitudinal side bars A' A' are connected, and to these additional transverse bars $A^2$ are attached in front and rear of the bar A to form the rectangular main frame, on which the working parts of the machine are mounted. This frame is further stiffened by obliquely-arranged bars $A^3$, converging forwardly to the center of the width of the frame, where they unite, the shafts C being adjustably connected therewith, as shown.

B B indicate the carrying and driving wheels, mounted loosely on the axles $a$ $a$ and carrying each a spur-gear $b$, with which pinions on a transverse shaft $b'$ engage for actuating said shaft, which in turn, through suitable gearing, drives the crank-shaft $b^2$, actuating the cutters, and a short secondary shaft $b^3$, which actuates the chain conveyer shafts and binder mechanisms, as will appear.

In suitable bearings on the rear transverse bar $A^2$ are stepped upright shafts D' D' for actuating the chain conveyers and an intermediate upright binder-shaft D. These shafts are journaled at or near their upper ends in upright sleeves $e$ and $e'$ $e'$, formed one at the center and one at each end of the cross-head of a T-shaped yoke E, (see Fig. 8,) the longitudinally-arranged arm or stem E' of which curves forward and upward from the sleeve $e$ and has its horizontal forward end slotted longitudinally at $e^2$, for a purpose which will appear.

The shafts D' D' are each provided with sprocket-wheels $d$, $d'$, and $d^2$ for actuating the chain conveyers, and beneath the sprocket-wheels $d$ each shaft D' has a driving bevel-gear $d^3$ fast on it, which gears engage and are driven by bevel-pinions on the ends of the short transverse shaft $b^3$, the latter being actuated by spur-gears connecting it with the shaft $b'$, as shown in Figs. 4 and 5. The upper sprocket-wheels $d^2$, instead of being fast directly on the shaft D', are each secured on a sleeve $D^2$, which has a grooved or polygonal bore adapting it to slide up and down on the upper end of its shaft D', which is feathered or polygonal in form to match and drive the sleeve and its sprocket-wheel $d^2$.

Directly under the sprocket-wheels are located guide-frame pieces or planks F, F', and $F^2$, which are pivotally supported at their rear ends on the shafts D, said planks extending forward horizontally, the upper ones diminishing in length and each carrying a chain-pulley $f'$, journaled on a short upright stud $f$ near the forward end of the plank, around which pulleys the toothed chain conveyers $f^2$ pass, actuated from the sprocket-wheels $d$, $d'$, and $d^2$. These planks are rounded on their outer faces or edges to a point at their forward ends and form the inner guide-bars for the stalks. The lower plank F rests on the machine-frame, and to its front end is secured the inclined post $G^3$, to which the front ends of the plank F' are secured. To the upper end of the post $G^3$ the short post $G^4$ is secured, and to the latter the front end of the plank $F^2$ is adjustably connected. Along the upper side of the curved edge of the plank are raised ribs $F^3$, against the outer side of which the sprocket-chains rest, and thus travel to do their work. The outer guide-bars G G' $G^2$ are curved on their inner edges to conform in the main to the curve of the outer edges of the boards F, F', and $F^2$, the upper ones being made shorter, like the latter, and rounded outward to a point at their forward ends to give a broad gathering mouth or entrance between the guide-boards. One of the lower pairs of these guide-boards is shown detached in Fig. 6. They are connected near the center of their length by a transverse bar or strap $g$, rigidly secured to their lower faces and near their rear ends by a similar cross-bar $g'$, these bars connecting the guide-bars of said pair rigidly, so that they will swing together when the bar F is vibrated on the shaft D'. The forward ends of the points of the bars G, G', and $G^2$, like the forward ends of the planks F, F', and $F^2$, are connected by uprights $G^3$, inclined rearwardly to conform to the shortening of the upper bars, as shown in Figs. 2 and 3, and the upper guide-bar $G^2$, instead of being connected directly and rigidly to the inclined standard $G^3$, is adjustably connected by a pin with a perforated upright $G^4$, connecting the upper end of standard $G^3$ with the guide G', this arrangement permitting the vertical adjustment of the upper pairs of guide-bars $F^2$ $G^2$ to adapt them to the height of the stalks to be operated upon. The center cross-bar $g$ extends outside of the guide G, and has a standard $g^2$ secured to said extended end and rising in close proximity with the outer edges of the guides, each of which has a curved spring-bar $G^5$, rigidly secured to its forward end, said spring-bars extending back above and over the inner edge of its guide-board and conforming in shape thereto. These spring-bars are connected at or near the center of their length with the standards $g^2$ by rods $g^3$, surrounded by spiral springs $g^4$, which serve to press the spring-bars $G^5$ inward for crowding the stalks against and holding them in engagement with the teeth of the chain conveyers, which may be of any usual or preferred construction. The inner ends of the cross-bars $g$ are also extended in the form of a short rod $g^5$, which passes through an eye $h'$ in the lower end of a lever $h$, pivoted to a rack-standard H, (see Fig. 7,) with which a thumb-latch attached to a lever engages for holding said lever, and with it the grain guides or guards F and G, at any desired adjustment. The handle-rod end $g^5$ of bar $g$ extends through and beyond the lever $h$, and between said lever and a pin in the end of the rod $g^5$ on one side and the lever and guide-board F on the other side of the lever springs $g^6$ are arranged, which permit the guards to yield laterally under the action of the stalks as they enter the guide-points before they are cut.

The heel ends of the guard-boards F, F', and $F^2$ are provided with curved stripper rods or bars $f^3$, which extend around and inward behind the sprocket-wheels and diverge therefrom sufficiently to strip the stalks from the chain conveyers. The rod $g^3$, connecting the upper spring-bar $G^5$ with the standard $g^2$, passes through a vertical slot $i$ in the latter, (see Fig. 3,) which permits its vertical adjustment. The upper chain conveyer and binder are adjusted by means of a lever I, pivoted to a bracket $i'$ on a standard I', secured to the axle-bar or main frame and passing up through an eye or slot $e^3$ in the stem E' of the yoke E, and serving thereby to steady the latter. A pin on the rear end of lever I at $i^2$ enters a slot in the yoke E near the sleeve $e$, and the forward arm of the lever, passing the post I, is held at the desired adjustment by means of a pin inserted in any one of a series of perforations at $i^3$ in said post.

The crank-shaft $b^2$ is provided in advance of the bevel-pinion actuating it with a bevel-pinion at $j$, which engages a bevel-wheel formed on the lower face of a crank-disk J, journaled on an upright stud supported in any suitable manner on the axle-bar A. A crank-arm $j'$ on this disk J is connected by a rod J' with a crank-arm $j^2$ on the binder-shaft D, and serves as the disk is rotated to vibrate the arm $j^2$, as indicated in dotted lines, Fig. 5, and with it the shaft D and binder-arm K, fast on the upper end of a sleeve $D^3$, feathered to the shaft and adapted to slide up and down with the yoke E on said shaft D. The arm K has a link $k$ pivoted to it, said link being connected at its forward end with an arm $k'$, which at its forward end has a pendent spur at $k^2$, which enters and is adapted to slide forward and backward in the slot $e^2$. The rear end of the arm or link $k'$ is pivoted to the knotter-arm K', which is journaled loosely on the sleeve $D^3$, the arrangement described serving to vibrate the knotter-arm simultaneously with but in an opposite direction from the binder-arm. The binder and knotter mechanism may be of any usual or preferred form or type operating in connection with vibrating binder and knotter arms. In operation these arms are brought into the position shown in Fig. 1 for binding the stalks, but when separated to discharge the bundle and to receive the stalks for another are swung forward into the position shown in Fig. 2, in which the ends of said arms are brought inside of the vertical planes of the operative sides of the chain conveyers, thereby permitting the stalks to pass them and to be carried by said chains into the binder-receptacle intermediate the rear ends of the pairs of chain conveyers and between the binder and knotter arms and the compressor-arms $l\ l$ and over the slatted dropper M, which forms the bottom of said receptacle.

N N are the cut-off bars, pivoted at their forward ends to the frame-pieces F, F', and F², one to each, near their outer operative faces, as shown, and extending back to the chain sprocket-wheels. The rear ends of these bars are slotted longitudinally at $n$, and a spur on a crank $n'$ on the vibrating upright shafts N', pivoted on the guard F, enters said slot, other arms of the shafts N' being connected by links $n^2$ with a crank-arm $n^3$ on the binder-shaft D, the arrangement being such that when the binder and knotter arms are vibrated to grasp and bind the corn in the receptacle, the cut-off arms N will be swung outward to crowd the incoming stalks out of the teeth of the chain conveyers, and so prevent their being fed to the binder-receptacle until the operation of binding the bundle is completed and the knotter and binder arms are swung back to permit the passage of the corn, as explained.

The compressor-arms $l\ l$ are fast each on the upper end of an inclined shaft L, stepped at its lower end in any suitable bearing on the machine-frame, one on each side of the dropper and journaled near its upper end in a bearing on the inner end of an angular horizontal bar L², supported by inclined and suitably-braced standards L'. The outer forwardly-bent ends of the bars L² project under the rear ends of the upper guide-bars G², and serve to guide the cornstalks from said ends inward to the binder-receptacle. The shafts L are provided near their lower ends with crank-arms $l'$, connected by links $l^2$ with the upper ends of vertically-vibrating levers $l^3$. The lower arms of these levers $l^3$ are curved inward and provided on their inner ends with forwardly-projecting pins or spurs, which enter horizontal slots $l^4$ in plates or arms $l^5$ on the ends of the dropper-platform sill M'.

Figure 9:
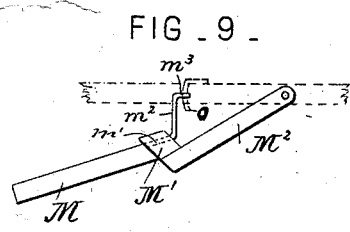
Figure 10:
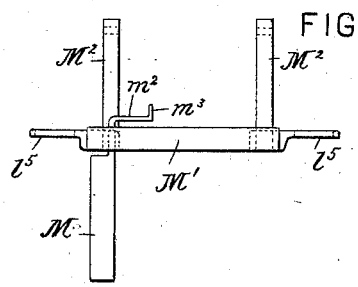
Figure 11:
Figure 12:

The dropper-platform M is composed of a series of longitudinally-arranged slats $m\ m$, each provided at its forward end and at one side thereof with a pivotal extension $m'$, which is journaled in an eye bearing in the sill M', and has a crank-arm $m^2$ formed on its forward end, (see Figs 9 and 10,) the pin $m^3$ of which enters one of a series of inclined slots $o$ in a cam-plate O, (see Figs. 11 and 12,) secured to the rear transverse frame-sill. The plate O has a slot for each slat of the dropper, and each slat has a crank engaging one of the slots $o$. The dropper-sill M' is secured to the rear ends of two arms M² M², which at their forward ends are pivoted to the machine-frame bars in any suitable manner, as indicated in Fig. 9. Any usual or suitable means may be employed for tripping the dropper and allowing its rear end to drop with the weight of the shock or bundle upon it on the ground. As the dropper descends, the crank-pins $m^3$, engaging the cam-slots $o$ in the cam-plate O, will cause the slats $m$ to be rocked down from the horizontal position shown in Figs. 2 and 10 and in full lines, Fig. 3, to the vertical position, or one on edge, shown in Fig. 9 and in dotted lines, Figs. 3 and 4, in which the butts of the stalks will pass between the slats and rest on the ground, leaving the shock standing, while the machine advances, drawing the slats from beneath it. As the dropper descends, the slotted arms $l^5$ on the dropper-sill act on the levers $l^3$ and through said levers and their connections with the shafts L on the compressor-arms $l\ l$, vibrating the latter out of the way and releasing the shock or bundle, and as the dropper is raised to again receive the stalks the compressor-arms will be simultaneously returned to position to receive and compress the tops thereof. Any usual or suitable means may be employed for returning the dropper to its position for receiving the corn.

In Fig. 1 the cutters P P' are shown arranged in the same transverse vertical plane, in which case they would be operated from a single crank on the shaft $b^2$; but as this involves the simultaneous cutting of the hills in two rows, it is preferred to set one cutter enough in advance of the other, as indicated in Fig. 2, to enable the machine to cut the stalks of a hill in one row before it begins to act on those of the other row, thereby equalizing the labor and reducing the strain on the machine. This of course makes it necessary to provide the crank-shaft with two cranks $s\ s'$ and independent connecting-rods $t\ t'$, as shown in said Fig. 2. The cranks $s$ and $s'$ are set opposite each other on the shaft $b^2$, causing the two short knife-bars to move in opposite directions, the weight or momentum of one counterbalancing that of the other, thereby making the work of the crank-shaft much lighter than where a single long knife-bar is made to operate on both rows of corn.

The operation of the parts will be readily understood without further description. The cornstalks are caught between the grain guards or guides F and G and are upheld by them as the machine advances to cut them, after which they are carried back by the chain conveyers to the common binder receptacle and dropper in a standing position. They are then bound near the tops, the binder-arms being made adjustable, as described, for that purpose, after which the shock or bundle is deposited and left standing on the ground, as described.

Figure 14:
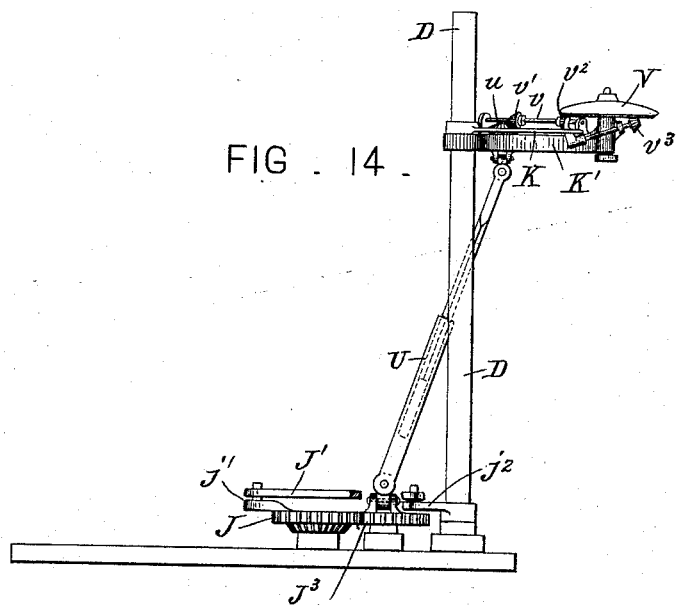

The means for actuating the knotter are shown in Figs. 13 and 14, U indicating an extensible tumbling-shaft connected by a universal joint with a spur-gear J³, in mesh with and driven by the crank-wheel J. The upper end of this shaft is connected by a universal joint with a short upright extension journaled in the swinging knotter-arm K' and carrying a bevel-pinion $u$ on its upper end. $v$ is a short horizontal shaft journaled in bearings on the knotter-arm and carrying a pinion $v'$, engaging the bevel-wheel $u$. The outer end of this shaft $v$ carries a bevel-pinion $v^2$, which drives the crown or bevel-wheel V on the knotter-arm, the last-named wheel engaging a bevel-wheel $v^3$ on the knotter-shaft for actuating the latter. The extensible tumbling-shaft accommodates itself to the swinging of the knotter-arm and also to the adjustment of the height of the binder mechanism, as explained.

Having thus described my invention, I claim as new and desire to secure by Letters Patent—

1. In a corn-harvester, a conveyer consisting of a series of horizontally-moving toothed chains arranged to move the cornstalks from the cutters to a receptacle in an upright position and means to laterally adjust the front end of the conveyer, for the purpose stated.

2. In a corn-harvester, a conveyer consisting of a series of horizontally-moving toothed chains and having grain-guides F and G extending forward of the cutters, in combination with means for adjusting the forward ends of said conveyers and guides and springs arranged to allow said grain-guides to yield laterally independently of the adjusting devices, for the purpose stated.

3. The combination of the chain conveyers $f^2 f^2$, having grain-guides F and G, the levers $h$, and the springs $g^6 g^6$, substantially as described.

4. The combination of the two series of horizontally-moving toothed chains $f^2$ with their guides F and G, pivotally supported at their rear ends and arranged to convey the corn in an upright position from the cutters to a common receptacle, and the spring-bars $G^5$ to hold the corn in contact with said chains, substantially as described.

5. The combination of the two series of conveying toothed chains $f^2$, the pivotally-supported guides F and G therefor, the spring-bars $G^5$, the springs $g^4$, and the bearing-posts $g^2$, substantially as described.

6. Chain conveyers and grain-guides operating in connection therewith pivotally supported at each side of and in combination with the interposed automatic binder mechanism, and a common receptacle in rear of said binder mechanism in which the corn is bound, substantially as described.

7. The combination of the pivotally-supported chain conveyers $f^2 f^2$ and grain-guides G G, operating in connection therewith, arranged to convey the corn in a standing position from the cutters into a common receptacle, an automatic binder located intermediate the rear ends of said conveyers and arranged to bind the corn in said receptacle, and a dropper adapted to drop the bound shocks on the ground in a standing position, substantially as described.

8. The combination of the two conveyers $f^2 f^2$, arranged to convey the corn from two rows in a standing position from the cutters to a common receptacle, an automatic binder located intermediate the rear end of said conveyers to bind the grain in said receptacle, and cut-off arms N, also located between the conveyers and connected with said binder, to operate simultaneously with the movements of the binder, substantially as described.

9. The combination of the series of pivotally-supported toothed conveying-chains $f^2 f^2$ and guide-bars G, G', and $G^2$, operating in connection therewith, the sprocket-wheels $d$ $d' d^2$, the vertical shaft D' therefor, the sprocket-wheel $d^2$ being made adjustable on said shaft, substantially as described.

10. Automatic conveyers pivotally supported, one on each side of the machine, and arranged to convey the corn from two rows in a standing position from the cutters to a common receptacle, in combination with an automatic binder located between said conveyers and arranged to bind the corn in said receptacle and made adjustable vertically, substantially as described.

11. The combination of the vertically-adjustable binder, the upper conveying toothed chain, the vertical shafts D', and the sprocket-wheels $d^2$, said chain and sprocket-wheels being adapted to be adjusted vertically with said binder, substantially as described.

12. The combination of the two conveyers arranged to convey two rows of corn in a standing position from the cutters into a common receptacle on the rear end of the main frame, the automatic binder arranged between the rear ends of said conveyers, and the vibrating needle and the vibrating knotter-head, both arranged to swing within the path of the conveyers, substantially as described.

13. The combination of the dropper-slats $m$, journaled at one end in the dropper-sill, the crank-arms $m'$, connected to said journaled ends, and the slotted cam-plate O for rocking said slats, for the purpose stated.

14. In a corn-harvester adapted to operate on two rows of corn, separate cutters therefor arranged at right angles to the path of the machine in parallel planes, one in advance of the other, so as to operate on the rows alternately, in combination with separate cranks for actuating said cutters, substantially as described.

In testimony whereof I have hereunto set my hand this 16th day April, A. D. 1891.

JNO. F. SEIBERLING.

Witnesses:
H. S. STETLER,
A. L. DICKINSON.